US009220083B2

(12) United States Patent
Nikkelen

(10) Patent No.: US 9,220,083 B2
(45) Date of Patent: Dec. 22, 2015

(54) IP-BASED PAGING FOR DSDS

(75) Inventor: Vincent Nikkelen, Staffanstorp (SE)

(73) Assignee: ST-Ericsson SA, Plan-les-Ouates (CH)

( * ) Notice: Subject to any disclaimer, the term of this patent is extended or adjusted under 35 U.S.C. 154(b) by 225 days.

(21) Appl. No.: 13/994,190

(22) PCT Filed: Dec. 15, 2011

(86) PCT No.: PCT/EP2011/072837
§ 371 (c)(1),
(2), (4) Date: Jun. 14, 2013

(87) PCT Pub. No.: WO2012/080377
PCT Pub. Date: Jun. 21, 2012

(65) Prior Publication Data
US 2013/0267261 A1 Oct. 10, 2013

Related U.S. Application Data

(60) Provisional application No. 61/435,619, filed on Jan. 24, 2011.

(30) Foreign Application Priority Data

Dec. 15, 2010 (EP) .................................... 10195139

(51) Int. Cl.
H04W 68/00 (2009.01)
H04W 8/18 (2009.01)
(Continued)

(52) U.S. Cl.
CPC .............. *H04W 68/00* (2013.01); *H04W 8/183* (2013.01); *H04W 8/26* (2013.01); *H04W 68/12* (2013.01); *H04W 88/06* (2013.01)

(58) Field of Classification Search
CPC ..... H04W 68/00; H04W 68/04; H04W 68/06; H04W 68/08; H04W 68/12; H04W 8/183; H04W 8/26; H04W 88/06
USPC ....................................... 455/426.1, 458, 422
See application file for complete search history.

(56) References Cited

U.S. PATENT DOCUMENTS 6,792,278 B1 * 9/2004 Ahmavaara et al. .......... 455/461
8,170,616 B2 * 5/2012 Lee ............................... 455/558
(Continued)

FOREIGN PATENT DOCUMENTS

EP 1223768 A1 7/2002
EP 2254364 A1 11/2010
(Continued)

Primary Examiner — Amancio Gonzalez
(74) Attorney, Agent, or Firm — Coats & Bennett, P.L.L.C.

(57) ABSTRACT

A method is disclosed for paging of a terminal having a first subscriber identity (IMSI1) attachable to a first mobile communication network (101) and a second subscriber identity (IMSI2) attachable to a second mobile communication network (201). The method is performed in a controller node (213; 600) of the second mobile communication network and involves registering (310, 410) the terminal's second subscriber identity (IMSI2) as attached to the second mobile communication network (201), followed by registering (320, 420) an auxiliary paging address (422) for the terminal's second subscriber identity. Then, a need to page the terminal's second subscriber identity is determined (330), and the terminal's second subscriber identity is paged (340). The paging involves sending (240) an auxiliary paging message (442) to the registered auxiliary paging address, and the auxiliary paging message is adapted for delivery to the terminal's first subscriber identity (IMSI1).

27 Claims, 10 Drawing Sheets

(51) Int. Cl.
*H04W 8/26* (2009.01)
*H04W 68/12* (2009.01)
*H04W 88/06* (2009.01)

(56) References Cited

U.S. PATENT DOCUMENTS

| | | |
|---|---|---|
| 2003/0013442 A1 | 1/2003 | Holmes et al. |
| 2006/0182069 A1 | 8/2006 | Yu |
| 2006/0291483 A1 | 12/2006 | Sela |
| 2009/0312020 A1 | 12/2009 | Lee |
| 2010/0027467 A1 | 2/2010 | Wu et al. |
| 2011/0217969 A1* | 9/2011 | Spartz et al. ............... 455/422.1 |

FOREIGN PATENT DOCUMENTS

| | | |
|---|---|---|
| GB | 2439370 A | 12/2007 |
| WO | 2010140781 A2 | 12/2010 |

* cited by examiner

Prior to step 510 of Fig 6:

IP-BASED PAGING FOR DSDS

TECHNICAL FIELD

The present invention relates to paging of terminals of the kind having a first subscriber identity attachable to a first mobile communication network and a second subscriber identity attachable to a second mobile communication network. More particularly, the invention relates to methods for paging of such a terminal, and to an associated controller node, terminal platform, terminal and computer program products.

BACKGROUND

Paging is an important procedure in a mobile communication network. Paging is for instance used in mobility management when searching for a given subscriber within a network coverage area. The reason for the paging may be that a communication transaction, such as a voice call or the delivery of a text message, is to be carried out between the core network of the mobile communication network and a mobile terminal.

Even if the paging mechanisms vary on a detailed level between different mobile communication network standards (such as GSM, UMTS, LTE, D-AMPS, CDMA2000, FOMA or TD-SCDMA), it remains a fact that paging is as essential procedure in a mobile communication network for locating a mobile terminal. Depending on network standard, a mobile terminal may be referred to as mobile station (MS, in GSM), user equipment (UE, in UMTS), etc. In this document, the term mobile terminal will be consistently used in a non-limiting sense without preference to any particular mobile communication network standard.

In recent years, a feature known as Dual SIM Dual Standby (DSDS) has been introduced for certain mobile terminals. DSDS enables a user to insert not only one Subscriber Identity Module (SIM) card in the mobile terminal, but in fact two SIM cards. In effect, this will provide the mobile terminal with two subscriber identities and allow the user to perform voice calls or other communication transactions using any of the two inserted SIMs. At power-on of the mobile terminal, both SIMs will do an IMSI (International Mobile Subscriber Identity) attach, either to the same or to different mobile communication networks. As there are two SIMs available, there will be two unique IMSIs as well. From a network point of view, the mobile terminal is seen as two different terminals. From an end user perspective, DSDS allows the user to replace two different mobile terminals by a single terminal.

Once the two IMSIs have been attached, the user can accept incoming transactions (such as voice or video calls, data transactions, messaging, etc) on either of the SIMs. The user may also initiate outgoing transactions using the SIM of his preference. However, once one of the SIMs is involved in an active connection (referred to as the primary SIM), the other SIM (secondary SIM) cannot be reached from the network.

In this respect, DSDS differs from DSDC (Dual SIM Dual Connectivity) in that the latter is able to have simultaneously ongoing active connections on the different SIMs. However, the expense of this ability is that the radio interface to the mobile communication network(s) needs to be duplicated in a DSDC terminal. This introduces a significant increase in cost, power consumption and apparatus size. Whereas DSDS has advantages in this respect, there are still some problems associated with DSDS.

For instance, when an active connection is ongoing on the primary SIM, no call or other network service can be received on the secondary SIM. From a network point of view, the secondary SIM seems to have disappeared (i.e., cannot be reached). Paging requests to the secondary SIM will not be received, and the user will not be alerted about an incoming call, SMS or another communication transaction, addressed to the secondary SIM.

One attempt to handle this issue for a manufacturer of mobile terminals may be to explicitly warn end-customers that when for instance making a phone call on the primary SIM, one is not available on the secondary SIM. Not being available (i.e., unable to reach) on one SIM may still be unsatisfying to the user, even if the user understands why.

Furthermore, modern mobile terminals often have operating systems/software platforms, like Android, iOS or Linux, which are heavily network-oriented. In several common situations, such mobile terminals will perform background tasks which involve autonomous connections to the network. Examples of such connections are:
  Email—Checking periodically if there is new email available,
  RSS feeds—Checking for news flash information,
  Current weather and financial data—Frequent updates of changing data,
  Software and security updates—Most modern operating systems/software platforms have an auto update function.

Since the above-mentioned network connections occur autonomously, the user typically does not take any action in order to initiate them. While this of course is convenient, it also means that the user therefore is often not aware of when they occur.

In fact, it can be expected that an average user may not even be aware of such background activities being performed in his mobile terminal. While he will notice the results of the updates, he will probably not give any thought as to how they are achieved.

As a consequence, the secondary SIM is often temporarily not reachable without the user being aware of this fact. There is a risk that the user will perceive this as a malfunction of the mobile terminal and act to return the terminal to the store where it was purchased, and/or make a complaint to the network operator about the perceived service levels.

Therefore, there is a need for improvements with respect to these problems.

SUMMARY

It is accordingly an object of the invention to eliminate or alleviate at least some of the problems referred to above.

The present inventor has realized that when the secondary subscriber identity of a DSDS terminal cannot be reached using normal radio-based paging in the mobile communication network, it is still possible to reach the terminal from the network of the secondary SIM using an IP connection (or another available connection) created over the radio interface of the primary subscriber identity. This has been reduced to practice at least according to the aspects and embodiments of the invention referred to below.

One aspect of the present invention therefore is a method for paging of a terminal having a first subscriber identity attachable to a first mobile communication network and a second subscriber identity attachable to a second mobile communication network. The method according to this first aspect is performed in a controller node of said second mobile communication network and comprises the steps of:
  registering the terminal's second subscriber identity as attached to the second mobile communication network;

registering an auxiliary paging address for the terminal's second subscriber identity;

determining a need to page the terminal's second subscriber identity; and paging the terminal's second subscriber identity, wherein said paging involves sending an auxiliary paging message to the registered auxiliary paging address, and wherein the auxiliary paging message is adapted for delivery to the terminal's first subscriber identity.

In one or more embodiments, registering an auxiliary paging address for the terminal's second subscriber identity involves:

receiving from the terminal's second subscriber identity a request for auxiliary paging, wherein said request includes said auxiliary paging address; and acknowledging to the terminal's second subscriber identity that the auxiliary paging address has been registered.

Said step of paging the terminal's second subscriber identity may involve sending the auxiliary paging message to the registered auxiliary paging address by way of IP-based data communication, wherein the registered auxiliary paging address includes an IP address of the terminal's first subscriber identity.

The registered auxiliary paging address may further include at least one of a port number and a security key.

The IP-based data communication may be performed as radio-based packet-switched data traffic over said first and second mobile communication networks.

One or more embodiments comprise(s) the additional steps of:

receiving a rejecting response to the auxiliary paging message from the terminal's first subscriber identity, said rejecting response indicating that the terminal is unavailable for performing mobile communication transactions with the terminal's second subscriber identity; and suspending sending further auxiliary paging messages at least for a certain time period.

In one or more embodiments, where the second mobile communication network comprises a core network and a radio access network, said step of paging the terminal's second subscriber identity involves, prior to, in parallel with or after the sending of the auxiliary paging message, sending a radio-based paging request to the terminal's second subscriber identity over the radio access network.

A second aspect of the invention is a method for paging of a terminal having a first subscriber identity attachable to a first mobile communication network and a second subscriber identity attachable to a second mobile communication network. The method according to the second aspect is performed by the terminal and comprises the steps of:

in an active mode of the first subscriber identity on the first mobile communication network, receiving an auxiliary paging message concerning the terminal's second subscriber identity and originating from a controller node of said second mobile communication network;

determining if the active mode of the first subscriber identity is to be terminated; and, if so, causing entry into an active mode of the second subscriber identity on the second mobile communication network; and responding to the auxiliary paging message for the second subscriber identity on the second mobile communication network.

In one or more embodiments, where the second mobile communication network comprises a core network and a radio access network, said step of responding to the auxiliary paging message means sending a radio-based paging response (also known as paging acknowledgement) from the terminal's second subscriber identity to said controller node over said radio access network.

The method according to the second aspect may comprise the initial steps of:

attaching the terminal's second subscriber identity to the second mobile communication network;

sending a request for auxiliary paging to a controller node of the second mobile communication network, wherein said request includes an auxiliary paging address for the second subscriber identity;

receiving an acknowledgement from said controller node of the second mobile communication network; and generating to said first subscriber identity an auxiliary paging monitor control instruction concerning the auxiliary paging address for the second subscriber identity.

The method may further comprise:

attaching the terminal's first subscriber identity to the first mobile communication network;

receiving the auxiliary paging monitor control instruction; and initiating monitoring of the auxiliary paging address to allow reception of said auxiliary paging message by said first subscriber identity.

In one or more embodiments, the auxiliary paging address includes an IP address associated with the terminal's second subscriber identity, and the auxiliary paging message is received by way of IP-based data communication.

The auxiliary paging address may further include at least one of a port number and a security key.

The step of determining if the active mode of the first subscriber identity is to be terminated may involve:

presenting via a user interface of the terminal an option to terminate the active mode of the first subscriber identity and enter active mode for the second subscriber identity; and retrieving via a user interface of the terminal an indication of whether or not the active mode of the first subscriber identity is to be terminated. The user interface utilized in the step of presenting may or may not be the same user interface as is utilized in the step of retrieving.

Alternatively or additionally, the step of determining if the active mode of the first subscriber identity is to be terminated may involve:

deciding whether the terminal is involved in an ongoing communication transaction for the first subscriber identity with the first mobile communication network; and, if so, concluding that the active mode of the first subscriber identity is not to be terminated.

Alternatively, the step of determining if the active mode of the first subscriber identity is to be terminated may involve:

deciding whether the terminal is involved in an ongoing communication transaction for the first subscriber identity with the first mobile communication network; and, if so, discriminating between at least a first transaction type and a second transaction type for said ongoing communication transaction;

in case said ongoing communication transaction is of said first transaction type, concluding that the active mode of the first subscriber identity is not to be terminated; and in case said ongoing communication transaction is of said second transaction type, concluding that the active mode of the first subscriber identity is to be terminated.

In one or more embodiments, if the active mode for the first subscriber identity is not to be terminated, a rejecting response to the auxiliary paging message may be sent by way of IP-based data communication from the terminal's first subscriber identity, said rejecting response indicating that the terminal is unavailable for performing mobile communication transactions with the terminal's second subscriber identity.

One or more alternative embodiments involve(s), if the active mode of the first subscriber identity is not to be terminated:

temporarily suspending the active mode of the first subscriber identity;

temporarily entering into active mode for the second subscriber identity, sending a radio-based rejecting paging response from the second subscriber identity to said controller node over said second mobile communication network, and exiting the active mode of the second subscriber identity; and resuming the active mode of the first subscriber identity.

The above-mentioned or other embodiments may further comprise:

releasing a radio connection to the first mobile communication network, if it is concluded in said step of determining that the active mode for the first subscriber identity is to be terminated.

A third aspect of the invention is a controller node for paging of a terminal having a first subscriber identity attachable to a first mobile communication network and a second subscriber identity attachable to a second mobile communication network. The controller node is adapted to be comprised in the second mobile communication network, and the controller node comprises:

one or more modules adapted to register the terminal's second subscriber identity as attached to the second mobile communication network;

one or more modules adapted to register an auxiliary paging address for the terminal's second subscriber identity;

one or more modules adapted to determine a need to page the terminal's second subscriber identity; and one or more modules adapted to page the terminal's second subscriber identity, wherein said paging involves sending an auxiliary paging message to the registered auxiliary paging address, and wherein the auxiliary paging message is adapted for delivery to the terminal's first subscriber identity.

The controller node may be further configured to perform the steps of the method as defined above for the first aspect.

A fourth aspect of the invention is a terminal platform comprising a terminal controller and adapted to have a first subscriber identity attachable to a first mobile communication network, and a second subscriber identity attachable to a second mobile communication network, said terminal controller being configured to:

in an active mode of the first subscriber identity on the first mobile communication network, receive an auxiliary paging message concerning the terminal's second subscriber identity and originating from a controller node of said second mobile communication network;

determine if the active mode of the first subscriber identity is to be terminated; and, if so, cause entry into an active mode for the second subscriber identity on the second mobile communication network; and cause response to the auxiliary paging message for the second subscriber identity on the second mobile communication network.

Each of the first and second mobile communication networks may for instance be compliant with one or more standards selected from the group consisting of GSM, UMTS, LTE, D-AMPS, CDMA2000, FOMA or TD-SCDMA.

The terminal platform may be further configured to perform the steps of the method as defined above for the second aspect.

A fifth aspect of the invention is a Dual SIM Dual Standby (DSDS) terminal comprising a terminal platform according to the fourth aspect.

A sixth aspect of the invention is a computer program product comprising a computer readable medium having thereon computer program code, the computer program code being loadable into a data processing unit and adapted to cause performing of the method according to the first aspect when said computer program code is executed by the data processing unit.

A seventh aspect of the invention is a computer program product comprising a computer readable medium having thereon computer program code, the computer program code being loadable into a data processing unit and adapted to cause performing of the method according to the second aspect when said computer program code is executed by the data processing unit.

It should be emphasized that the term "comprises/comprising" when used in this specification is taken to specify the presence of stated features, integers, steps, or components, but does not preclude the presence or addition of one or more other features, integers, steps, components, or groups thereof.

BRIEF DESCRIPTION OF THE DRAWINGS

Objects, features and advantages of embodiments of the invention will appear from the following detailed description, reference being made to the accompanying drawings.

DETAILED DESCRIPTION

Figure 1:
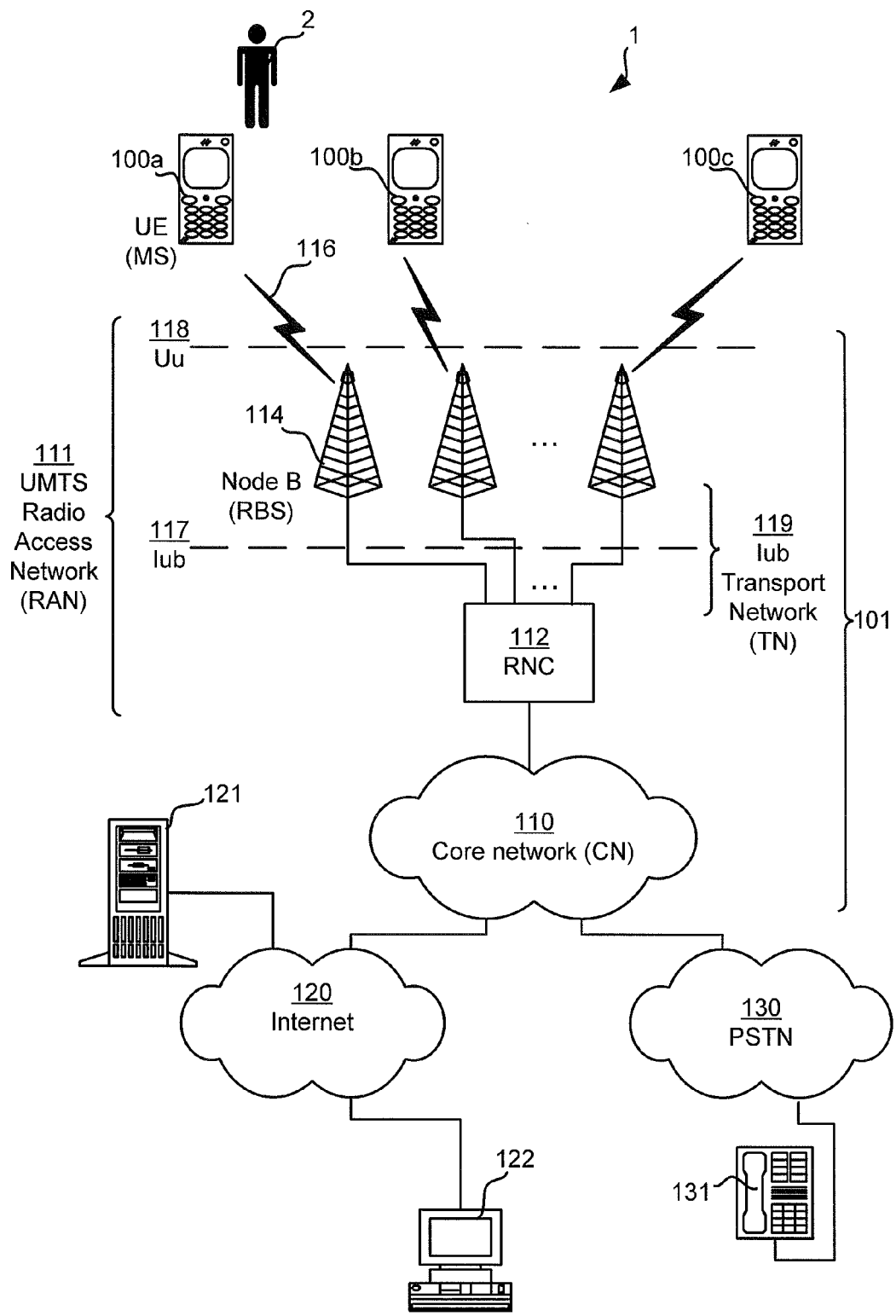
FIG. 1 is a schematic illustration of a non-limiting example of a telecommunication system including a mobile communication network and a plurality of mobile terminals.

Embodiments of the invention will now be described with reference to the accompanying drawings. The invention may, however, be embodied in many different forms and should not be construed as limited to the embodiments set forth herein; rather, these embodiments are provided so that this disclosure will be thorough and complete, and will fully convey the scope of the invention to those skilled in the art. The terminology used in the detailed description of the particular embodiments illustrated in the accompanying drawings is not intended to be limiting of the invention. In the drawings, like numbers refer to like elements.

Before turning to a detailed description of the disclosed embodiments, they will first be described on a general level with reference to FIGS. 1-4.

FIG. 1 illustrates a telecommunications system 1 based on a mobile communication network 101 according to the familiar 3G/UMTS system architecture, as defined in the 3GPP standards (available for instance at http://www.3gpp.com/). Users 2 of mobile terminals (user equipment, UE) 100a, 100b, 100c may use different telecommunications services, such as voice calls, Internet browsing, video calls, data calls, facsimile transmissions, still image transmissions, video transmissions, electronic messaging, and e-commerce. An individual one of the mobile terminals 100a-c connects to a mobile telecommunications core network 110 over a radio link 116 to a nearby radio base station (RBS) 114 (also known as Node B), which in turn is connected to a radio network controller (RNC) 112. A transport network (TN) 119, also known as Iub 117, is provided between the RNC 112 and RBS 114, and an air interface 118, also known as Uu, is provided between RBS 114 and UE 100. RNC 112, TN 119 and RBS 114 thus constitute a UMTS Radio Access Network (RAN) 111.

A conventional public switched telephone network (PSTN) 130 may be connected to the mobile telecommunications core network 110. Various telephone terminals, including a stationary telephone 131, may connect to the PSTN 130. The mobile telecommunications core network 110 is also typically associated with a wide area data network 120, such as the Internet. Server computers 121 and client computers 122 may be connected to the wide area data network 120 and therefore allow communication of packet data with the mobile terminal. Such packet-based communication may for instance be in accordance with the HSPA protocol set, including HSDPA for downlink communication and EUL (i.e. HSUPA) for uplink communication.

Figure 2:
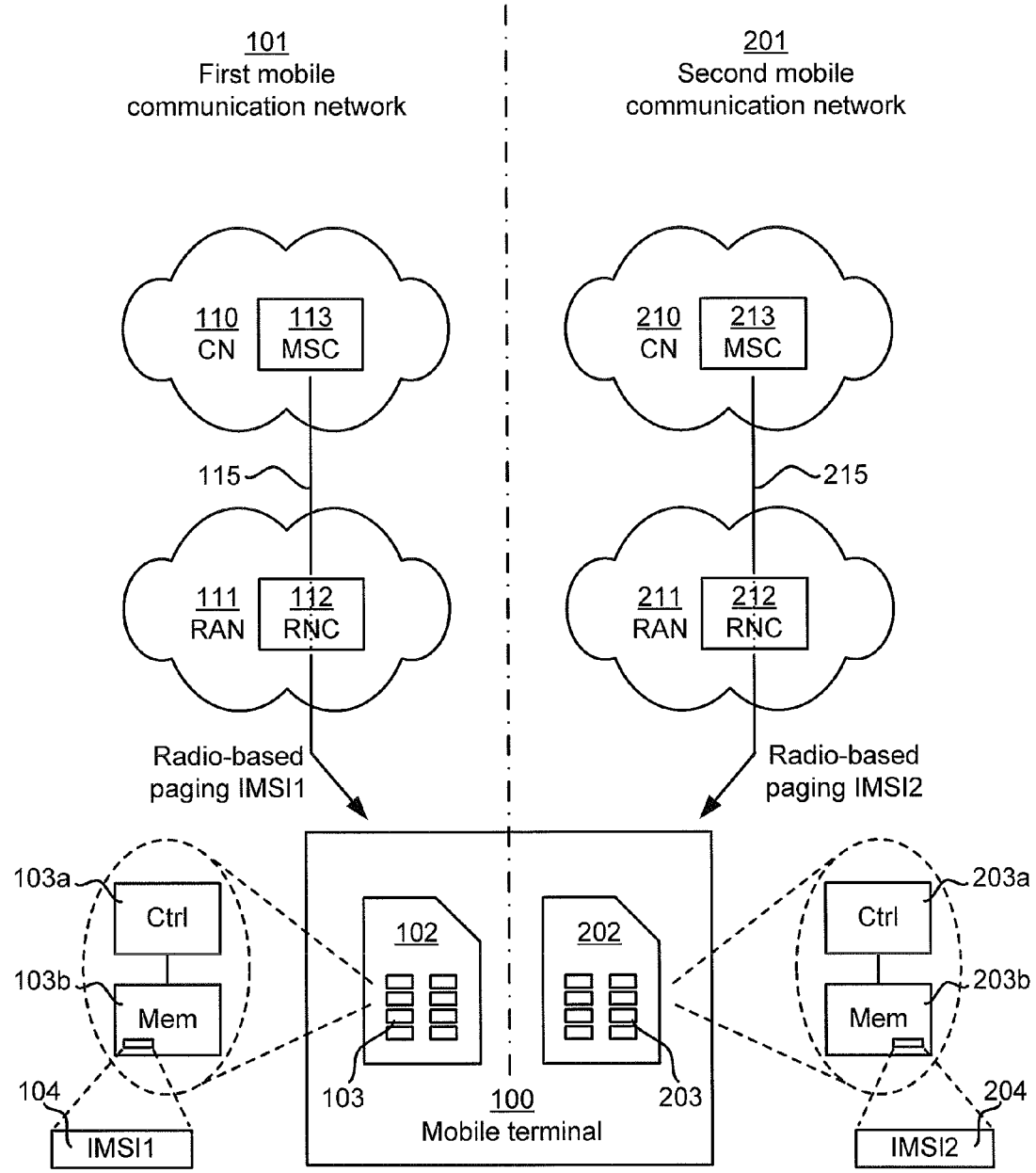
FIG. 2 schematically illustrates conventional radio-based paging of a DSDS mobile terminal attached to first and second mobile communication networks.
Figure 3:
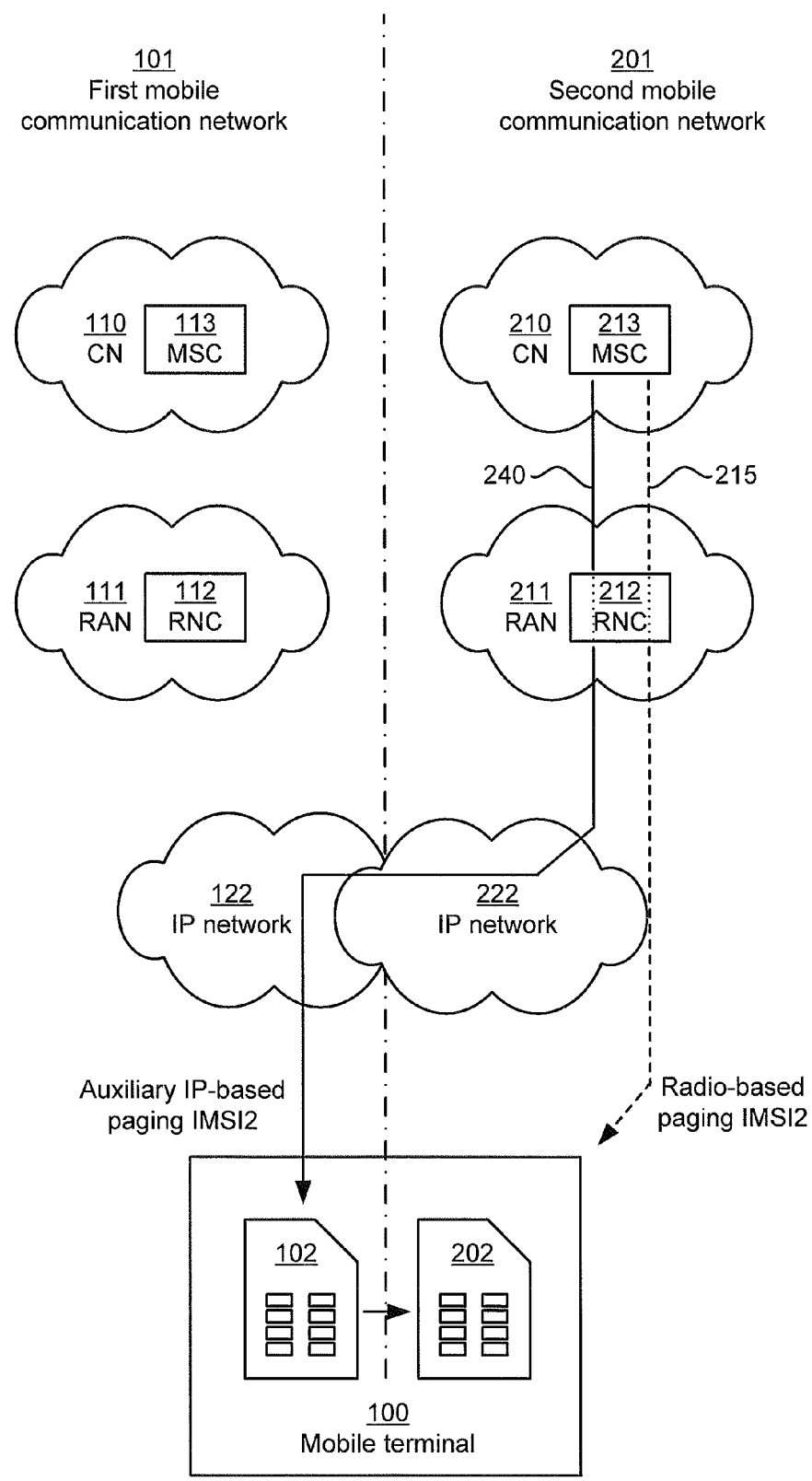
FIG. 3 schematically illustrates an approach to provide auxiliary paging of a DSDS mobile terminal attached to first and second mobile communication networks according to some embodiments of the invention.

FIG. 1 has illustrated the conventional situation when the mobile terminal has a single subscriber identity and attaches to a single mobile communication network 101. Embodiments of the present invention however relates to DSDS mobile terminals, i.e. mobile terminals capable of attaching to a first mobile communication network 101 using a first subscriber identity IMSI1, as well as to a second mobile communication network 201 using a second subscriber identity IMSI2. This situation is illustrated in FIGS. 2 and 3, whereas the basic configuration of an example DSDS mobile terminal 100 is illustrated in FIG. 4.

Figure 4:
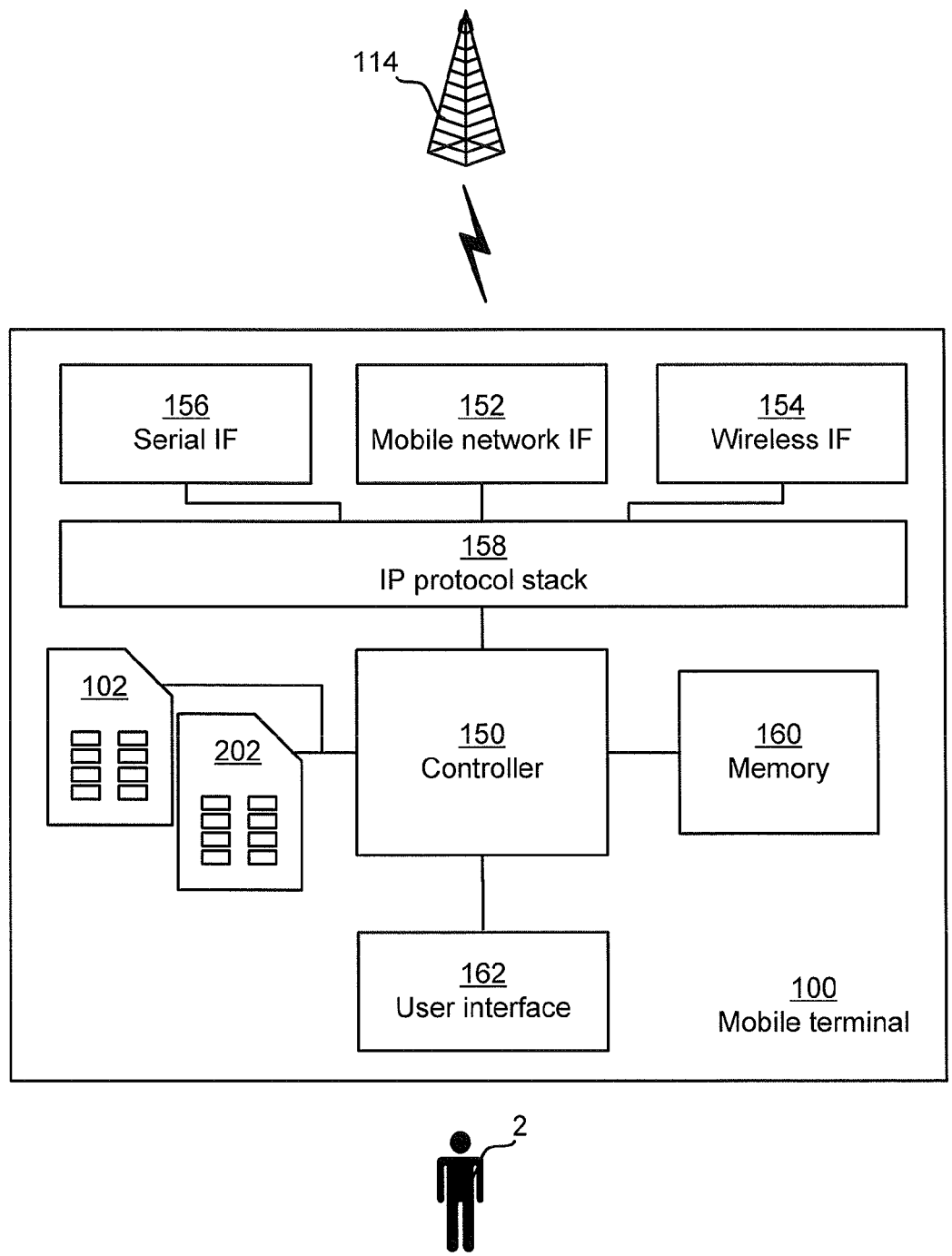
FIG. 4 is a schematic block diagram of a DSDS mobile terminal for which embodiments of the present invention may be applied.

Starting with FIG. 4, the DSDS mobile terminal 100 has a controller 150 which has the overall responsibility for controlling the operation of the terminal 100. In the disclosed embodiment, the controller 150 is a central processing unit (CPU), but it can alternatively be a digital signal processor (DSP), or other programmable electronic logic device such as an application-specific integrated circuit (ASIC) or field-programmable gate array (FPGA). The controller 150 is coupled to a memory 160 which comprises a work memory and a storage memory. The memory 160 may for instance be implemented in the form of RAM, EEPROM, flash memory (e.g. memory card), magnetic hard disk, or any combination thereof. The memory 160 is capable of storing program code which is executable by the controller 150 so as to cause performing of the terminal-side part of the auxiliary paging functionality as described in various parts of this document. In some embodiments, some or all of this terminal-side part of the auxiliary paging functionality may instead be performed by dedicated hardware.

The DSDS mobile terminal 100 has a mobile network interface 152 which allows the terminal 100 to communicate with the first mobile communication network 101 and the second mobile communication network 201. The mobile network interface 152 comprises an internal or external antenna as well as appropriate radio circuitry for establishing and maintaining a wireless link to a nearby base station in any of the networks 101 or 201 (e.g. link 116 and base station 114 in FIG. 1). The radio circuitry comprises a radio receiver and transmitter formed for instance by band pass filters, amplifiers, mixers, local oscillators, low pass filters, AD/DA converters, etc.

In addition, the disclosed embodiment of the terminal 100 has a wireless interface 154 which may be adapted for communication in accordance with one or more short-range wireless communication standards such as Bluetooth, WiFi (e.g. IEEE 802.11, wireless LAN), Near Field Communication (NFC), or Infrared Data Association (IrDA). A serial interface 156, such as USB, allows the terminal to communicate over a serial cable with for instance a personal computer. Such interfaces may be absent in other embodiments.

An IP protocol stack 158 is provided to allow packet-based IP data communication via any of the interfaces 152, 154 and 156.

A user interface 162 allows the user 2 to interact with the DSDS mobile terminal 100. The user interface 162 includes display means, such as at least one LCD display, as well as input means for the user. The input means may e.g. include a keypad with alpha-numeric keys and/or other keys such as arrow keys (navigation keys) and functional keys (soft keys), and/or a joystick, touch pad, rotator, jog dial, etc. The display means and input means may be jointly realized by a touch-sensitive display in some embodiments. The user interface 162 typically also involves a loudspeaker and a microphone.

The DSDS mobile terminal 100 may also be provided with other well-known components, such as power switch, battery, charger interface, accessory interface, and volume controls; such elements are however not indicated in FIG. 4 for the sake of brevity.

To be able to act as a DSDS mobile terminal, the terminal 100 has a first SIM reader capable of accessing a first SIM card 102, and a second SIM reader capable of accessing a second SIM card 202. As seen in FIGS. 2 and 3, the first SIM card 102 comprises electronic circuitry 103 which constitutes a local SIM controller 103a and a memory 103b. The memory 103b has a memory area 104 for storing the first subscriber identity in the form of a first IMSI number, IMSI1. Conversely, the second SIM card 202 comprises electronic circuitry 203 which constitutes a local SIM controller 203a and a memory 203b. The memory 203b has a memory area 204 for storing the second subscriber identity in the form of a second IMSI number, IMSI2.

In addition, any of the first and/or second SIM memories 103b, 203b may store commands or program instructions for providing value-added services, for instance in the form of an increased level of security through identity verification and encryption measures which serve to provide secure transactions. Such commands or program instructions in the SIM memories 103b, 203b may for instance be in compliance with any of the SIM Application Toolkit (STK), USIM Application Toolkit (USAT) or Card Application Toolkit (CAT) standards.

In FIG. 2, the DSDS mobile terminal 100 is shown as attached to the first mobile communication network 101 with the first subscriber identity IMSI1. Furthermore, the DSDS mobile terminal 100 is shown as attached to the second mobile communication network 201 with the second subscriber identity IMSI2. The first network 101 will perceive the DSDS mobile terminal 100 as any ordinary mobile terminal having the subscriber identity IMSI1, whereas the second network 201 will perceive the DSDS mobile terminal 100 as any ordinary mobile terminal having the subscriber identity IMSI2. FIG. 2 essentially illustrates a conventional dual-network situation for a DSDS mobile terminal. In the embodiments disclosed herein, each of the first and second networks 101, 201 may be implemented like the single mobile communication network 101 described above with reference to FIG. 1. In other words, the core networks 110, 210, and the radio access networks 111, 211 of the first and second networks 101, 201 may be implemented like the core network 110 and radio access network 111 of the single network 101 in FIG. 1. On the other hand, the fact that the first network 101 in FIGS. 2 and 3 bears the same reference numeral as the single mobile communication network 101 in FIG. 1 does not necessarily mean that they must be implemented in the same or similar manner.

The first network 101 may page the first subscriber identity IMSI1 of the mobile terminal 100 by sending a paging request 115 to the mobile terminal 100 identified as IMSI1. In the disclosed embodiment, the paging request is initiated by a Mobile Switching Center (MSC) 113, which is part of the core network 110, and is forwarded by the RNC 112 in the radio access network 111 through a nearby radio base station (not shown in FIG. 2) to the mobile terminal 100. In other embodiments, the paging request may be initiated at another node in the core network 110 or in the radio access network 111 (such as the RNC 112). Provided that the second subscriber identity IMSI2 is not in active mode and thus does not occupy the mobile network interface (radio interface) 152, the mobile terminal 100 will be able to receive the paging request 115 through the mobile network interface 152, and the controller will recognize that it is addressed to the first subscriber identity IMSI1. The controller 150 may then cause generation of a paging response by the first subscriber identity IMSI1. This paging response will be transmitted by the mobile network interface 152 onto the first network 1, to ultimately arrive at the node that sent the paging request (i.e. the MSC 113 in the disclosed embodiment).

Correspondingly, the second network 201 may page the second subscriber identity IMSI2 of the mobile terminal 100 by sending a paging request 215 from a mobile switching center 213 (or RNC 212) to the mobile terminal 100 identified as IMSI2. Provided that the first subscriber identity IMSI1 is not in an active mode and thus does not occupy the mobile network interface 152, the mobile terminal 100 will be able to receive the paging request 215 through the mobile network interface 152, and the controller will recognize that it is addressed to the second subscriber identity IMSI2. The controller 150 may then cause generation of a paging response by the second subscriber identity IMSI2. This paging response will be transmitted by the mobile network interface 152 onto the second network 201, to ultimately arrive at the MSC 213.

Thus, as long as both subscriber identities IMSI1, IMSI2 are in an idle mode (standby mode), any of them can receive and reply to a paging request from the first and second network 101, 201, respectively. However, if for instance the first subscriber identity IMSI1 is occupied with an ongoing communication transaction, like a voice call, on the first network 101 and therefore is in an active mode, the second subscriber identity IMSI2 will not be able to receive and reply to a paging request from the second network 201. In effect, the core network 210 of the second network 201 will perceive the mobile terminal 100 identified by the second subscriber identity IMSI2 as disappeared from the second network 201 for the time being.

As is illustrated in FIG. 3, the invention presents a solution to this problem. In FIG. 3, it is assumed that the first subscriber identity IMSI1 is occupied with an ongoing communication transaction and thus is in an active mode on the first network 101. When the second network 201 for some reason determines that there is a need to page the second subscriber identity IMSI2 of the mobile terminal 100, an ordinary paging request 215 is sent from the mobile switching center 213 to the mobile terminal 100 identified as IMSI2. However, since the first subscriber identity IMSI1 occupies the mobile network interface 152 of the mobile terminal 100, the terminal will not be able to receive the paging request 215, let alone reply to it. However, the second network 201 may nevertheless successfully page the second subscriber identity IMSI2 thanks to the introduction of auxiliary paging functionality in accordance with embodiments of the invention. Thus, in conjunction with the ordinary and unsuccessful paging request 215, the second network 201 (i.e. MSC 213) will also send an auxiliary paging request 240 intended for the second subscriber identity IMSI2. This auxiliary paging request 240 is IP-based in the disclosed embodiments and is thus communicated through an IP network 222 associated with the second network 201, then further on through an IP network 122 associated with the first network 101. The IP networks 222 and 122 are connected in some way, or even part of the same IP network in some embodiments, and may be implemented wholly or partly by the Internet. The auxiliary paging request 240, even if intended for IMSI2, is received by the first subscriber identity IMSI1. This is possible since the mobile terminal 100 is in active mode for the first subscriber identity IMSI1 and is therefore in control of the mobile network interface 152 and the IP protocol stack 158. When the controller 150 detects the received IP-based auxiliary paging request 240, it may take appropriate action in order to hand the control of the mobile network interface 152 over to the second subscriber identity IMSI2, thereby allowing IMSI2 to reply to the auxiliary paging request 240 by sending a paging response in the second network 201 to the MSC 213. Details of the possible action taken by the controller 150 when receiving the auxiliary paging request 240 will be further described later in this document.

The auxiliary paging request 240 may be communicated as packet-switched data (such as HSDPA when the first and second networks are UMTS compliant) which is sent in the second network 201, is conveyed over the IP networks 222 and 122, reaches the first network 101 and arrives at the mobile terminal 100 via the mobile network interface 152. As an alternative, however, the auxiliary IP-based paging request 240 may be received via the wireless interface 154 or serial interface 156.

The disclosed embodiments will now be described in more detail with reference to FIGS. 5-9.

Figure 5:
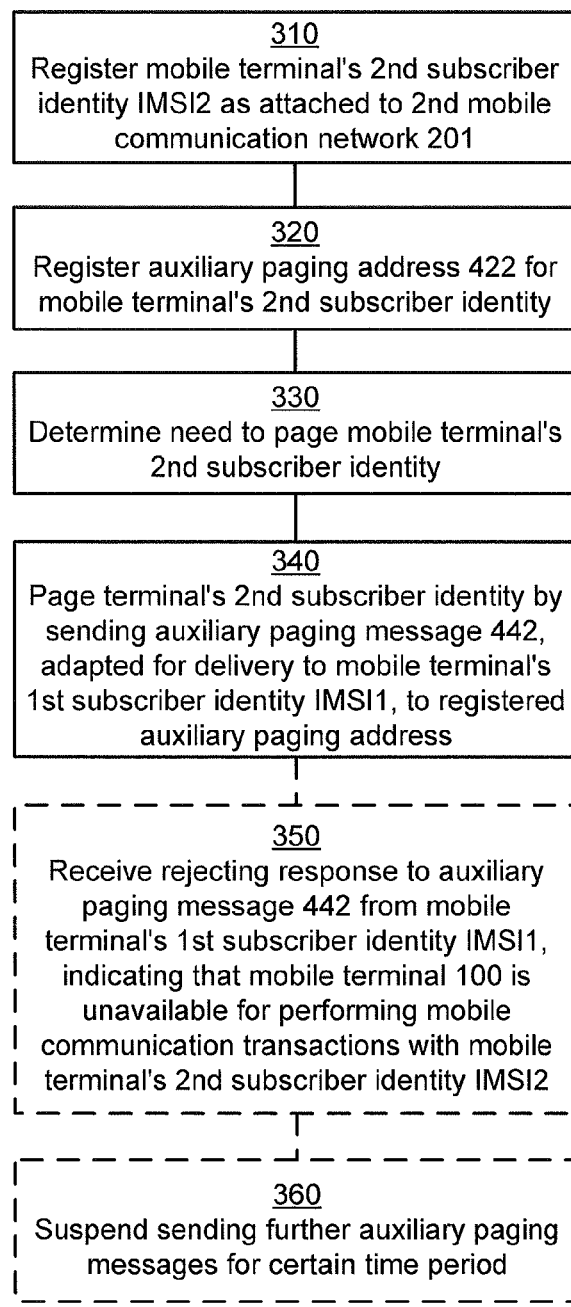
FIG. 5 is a schematic flowchart diagram of a method performed by a network node in the second mobile communication network to provide auxiliary paging of a DSDS mobile terminal according to some embodiments of the invention.
Figure 6:
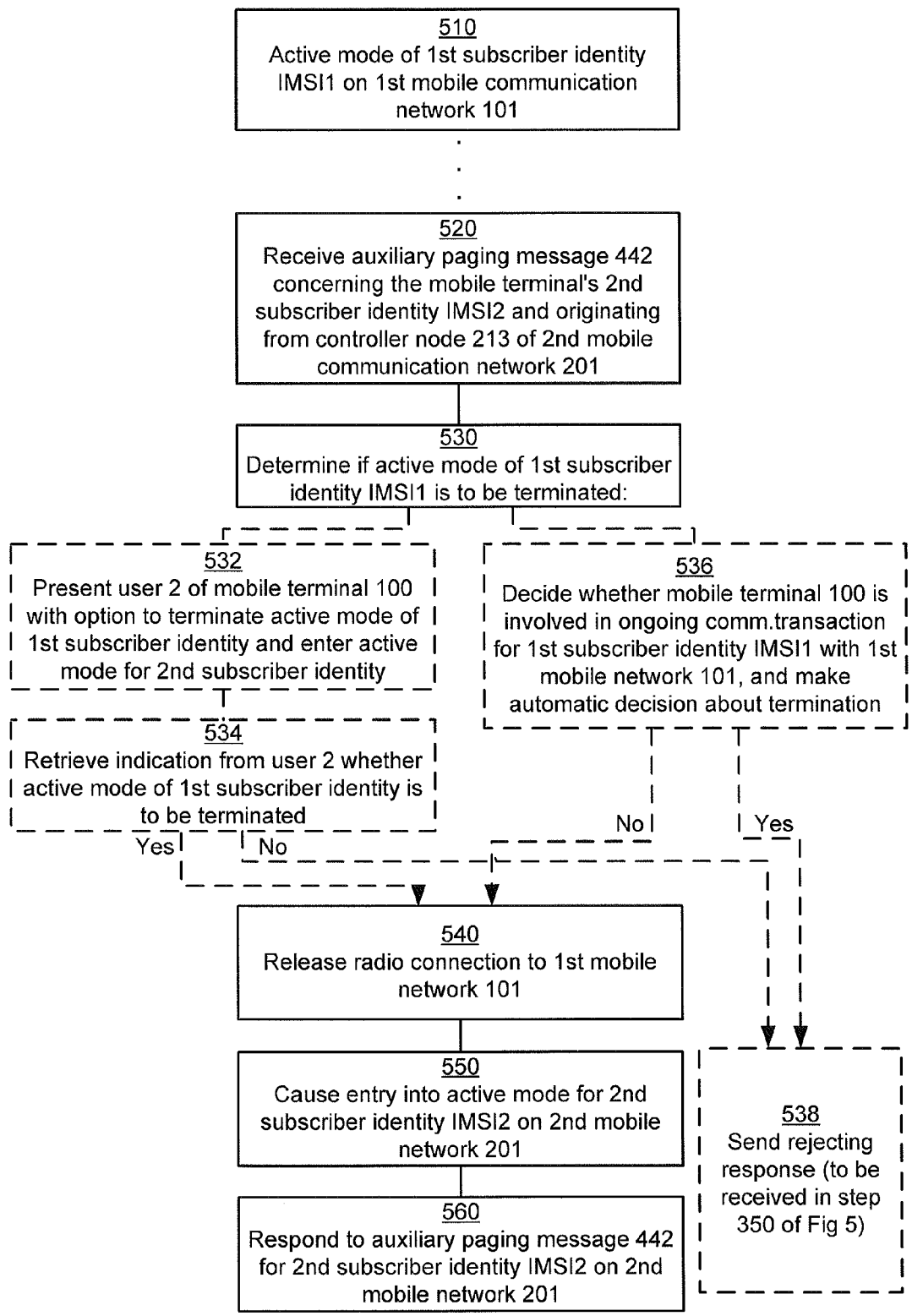
FIG. 6 is a schematic flowchart diagram of a method performed by a DSDS mobile terminal to participate in auxiliary paging according to some embodiments of the invention.
Figure 8:
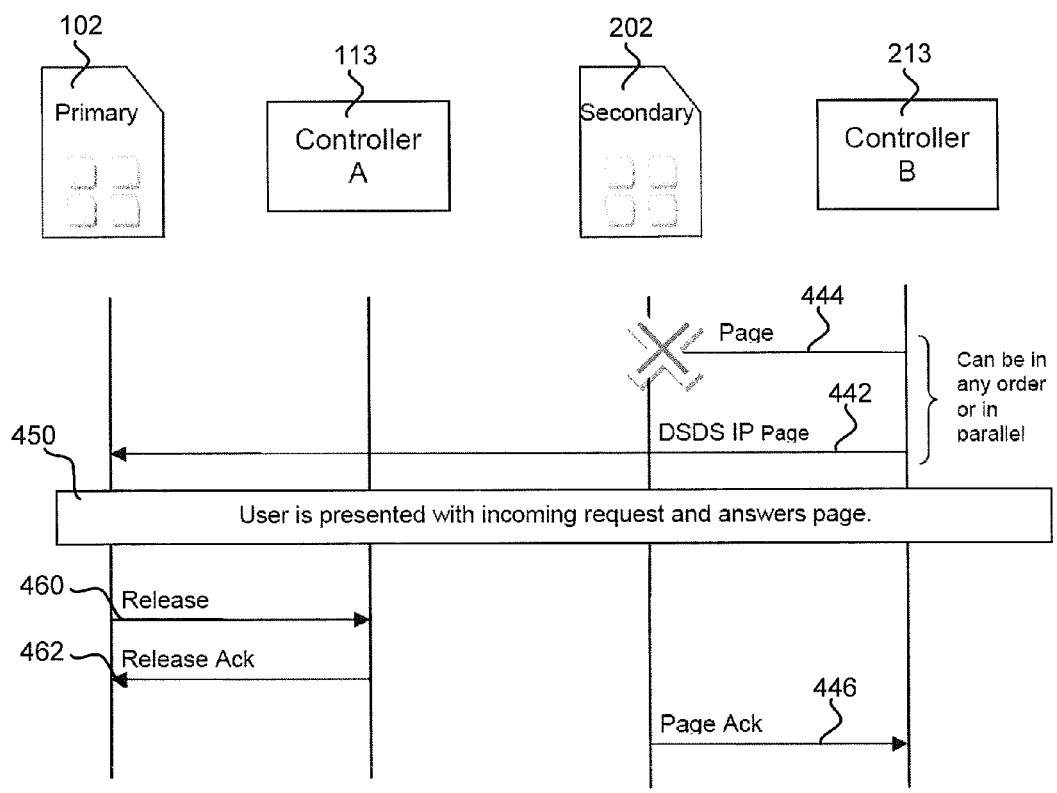
FIG. 8 is a schematic timing diagram which illustrates a chain of events occurring in the first and second mobile communication networks and the DSDS mobile terminal when performing auxiliary paging.

FIGS. 5 and 6 are flowchart diagrams which illustrate how auxiliary paging may be performed by the controller node 213 (MSC) in the second mobile communication network 201 and by the DSDS mobile terminal 100, respectively. FIG. 8 is a corresponding timing diagram for these events.

Initially, however, some activities performed in order to prepare for auxiliary paging functionality will be described with reference to FIGS. 6a and 7.

When the DSDS mobile terminal 100 is powered on, both SIM cards 102, 202 will attach to the respective mobile communication network 101, 201. This is seen in FIG. 7 at 400 for the first SIM card 102, and at 410 for the second SIM card 202. In response, the controller node 113 will register the first subscriber identity IMSI1 as attached to the first network 101, and send an acknowledgement 402 to the terminal 100. Correspondingly, the controller node 213 will register the second subscriber identity IMSI2 as attached to the second network 201, and send an acknowledgement 412 to the terminal 100. Any one or both of the first and second subscriber identities IMSI1, IMSI2 may now request auxiliary IP-based paging from its network 101, 201. In order not to obscure the disclosure, this will however only be described for the second subscriber identity IMSI2 in the following.

The second subscriber identity IMSI2 will send a request 420 for auxiliary IP-based paging to the controller node 213 of the second network 201. This request 420 will comprise an auxiliary paging address 422 which includes an IP address 424 belonging to the mobile terminal's first subscriber identity IMSI1 but associated with the mobile terminal's second subscriber identity IMSI2. The auxiliary paging address 422 may also include a port identifier 426. As will be explained later, the IP address 424 (and the port identifier 426) will define the IP address (and port number) of the mobile terminal's first subscriber identity IMSI1, to which the controller node 213 shall send IP-based auxiliary paging messages concerning the second subscriber identity IMSI2. For increased protection against malicious denial-of-service or spam attacks, the auxiliary paging address 422 may also include a security key 428.

It should be mentioned here that although the attach message 410 and the request 420 for auxiliary IP-based paging are illustrated as two separate messages from the second subscriber identity IMSI2 to the controller node 213 of the second network 201, one may be piggy-backed to the other in alternative embodiments. Also, it should be mentioned that auxiliary IP-based paging for the second subscriber identity IMSI2 does not necessarily have to be requested already upon attachment to the network 201; it could alternatively be requested at a later stage, for instance when the first subscriber identity IMSI1 is about to enter active mode.

The controller node 213 acknowledges, at 429, the request 420 to the second subscriber identity IMSI2 to confirm that the auxiliary paging address 422 has been duly registered by the controller node 213. In response, the second subscriber identity IMSI2 generates to the mobile terminal's first subscriber identity IMSI1 an auxiliary paging monitor control instruction 432 concerning the auxiliary paging address 422. To this end, the auxiliary paging monitor control instruction 432 may include, point at or otherwise relate to the auxiliary paging address 422, i.e. the IP address 424, as well as the port identifier 426 and security key 428, if applicable.

Figure 6A:
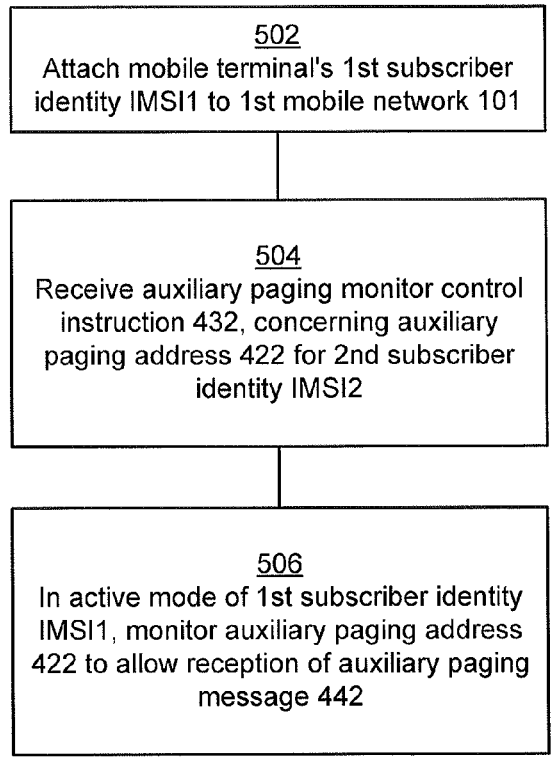
FIG. 6a is a schematic flowchart diagram of a method performed by a DSDS mobile terminal to prepare the mobile terminal for participation in auxiliary paging according to some embodiments of the invention.
Figure 7:
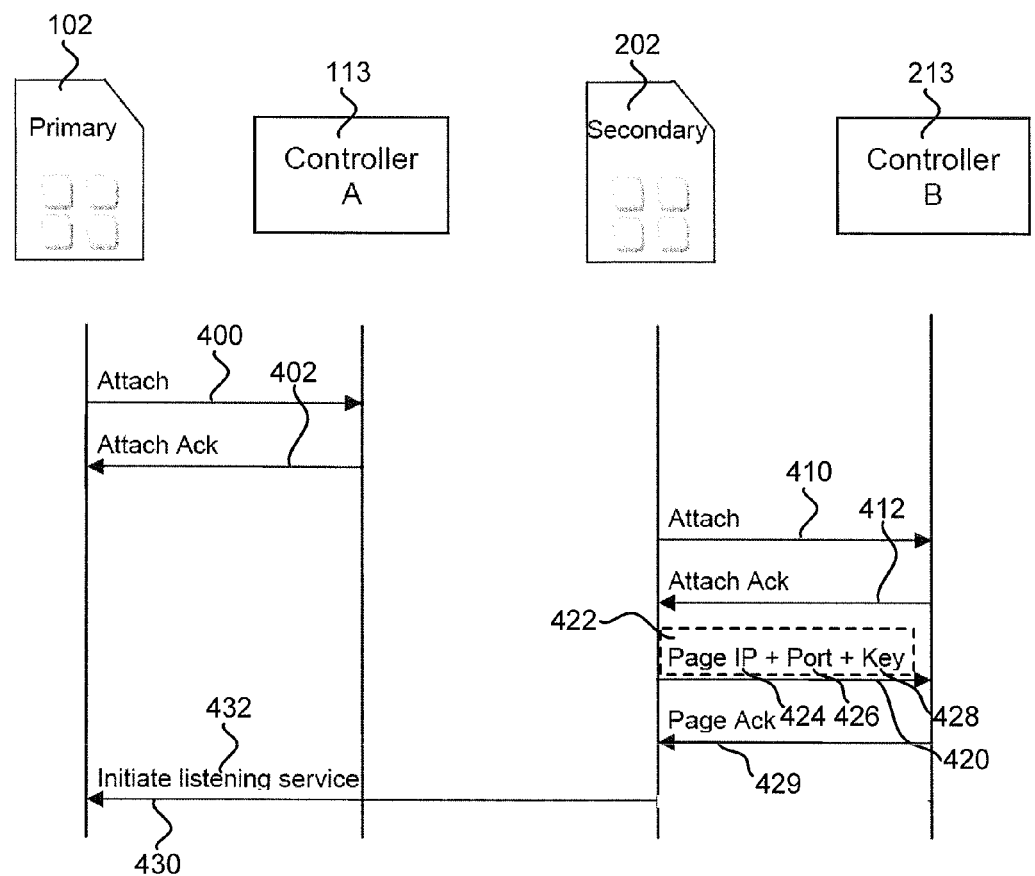
FIG. 7 is a schematic timing diagram which illustrates a chain of events occurring in the first and second mobile communication networks and the DSDS mobile terminal to prepare for auxiliary paging functionality according to some embodiments of the invention.

Receiving the auxiliary paging monitor control instruction 432 at 430 in FIG. 7 will cause the first subscriber identity IMSI1 of the mobile terminal 100 to start monitor for incoming IP-based auxiliary paging messages destined to the second subscriber identity IMSI2. Thus, from the terminal's view as seen in FIG. 6a, after having attached the first subscriber identity IMSI1 to the first network 101 in step 502 (cf 400 and 402 in FIG. 7), the first subscriber identity IMSI1 will receive the auxiliary paging monitor control instruction 432 in step 504. Accordingly, based on the information in the auxiliary paging address 422, the controller 150 will in cooperation with the IP protocol stack 158 register to monitor the IP address 424 (and port number 426) for incoming auxiliary paging messages 442. As seen in step 506, this monitoring will be active at least when the first subscriber identity IMSI1 is in active mode. In some embodiments, the monitoring may occur also when the first subscriber identity IMSI1 is in idle mode, even though the need for this would normally be less pronounced, since the second subscriber identity IMSI2 should be able to receive and respond to ordinary paging requests 215 from the second network 201.

When the preparations for auxiliary paging functionality have been completed as described above for FIGS. 6a and 7, the mobile terminal 100 and the controller node 213 of the second network 201 are now ready to utilize IP-based auxiliary paging of the terminal's second subscriber identity IMSI2 in order to avoid or reduce the previously explained problems associated with conventional DSDS mobile terminals. Reference is now made to FIGS. 5, 6, 8 and 9.

Starting with the network-side functionality, FIG. 5 illustrates the steps performed by the controller node 213 of the second network 201. In the initial steps 310 and 320, the controller node 213 has registered the second subscriber identity IMSI2 as attached (cf 410-412 in FIG. 7), and then registered the auxiliary paging address 422 to be used for the second subscriber identity IMSI2 (cf 420-429 in FIG. 7).

Then, at some stage the controller node 213 of the second network 201 may determine in step 330 of FIG. 5 that the second subscriber identity IMSI2 needs to be paged. The reasons behind this conclusion are not central to the present invention; it suffices here to say that the inventive auxiliary paging can be performed for any typically occurring situation in which a mobile terminal needs to be paged in a mobile communication network. In response, the controller node 213 of the second network 201 sends an ordinary (radio-based) paging request 444, 215 in the second network 201 to the second subscriber identity IMSI2; see the timeline chart of FIG. 8. In conjunction to this, the controller node 213 of the second network 201 also sends an auxiliary paging message 442, 240 in step 340. Even though being intended for the second subscriber identity IMSI2, in accordance with embodiments of the invention the auxiliary paging message 442 is adapted for delivery to the mobile terminal's first subscriber identity IMSI1 by way of IP-based communication over the IP networks 222 and 122.

As previously explained, the controller node 213 of the second network 201 sends the IP-based auxiliary paging message 442 to the auxiliary paging address 422 which has previously been registered in the mobile terminal 100 for the second subscriber identity IMSI2 (cf step 504 of FIG. 6a).

The sending of the auxiliary paging message 442 in step 340 may occur in any order (i.e., prior to, in parallel with or after) relative to the sending of the ordinary paging request 444. In one embodiment, the controller node 213 first sends the ordinary paging request 444, then waits during a predetermined time period for an ordinary (radio-based) paging response from the second subscriber identity IMSI2. If no such ordinary paging response is received during this time period, the IP-based auxiliary paging message 442 is sent.

As seen in step 510 of FIG. 6, when the first subscriber identity IMSI1 of the terminal 100 is in active mode, it is capable of receiving in step 520 the IP-based auxiliary paging message 442 which is intended for the second subscriber identity IMSI2. The reason is of course that the first subscriber identity IMSI1 has control of the communication interfaces 152-156 when being in active mode.

In step 530, the terminal 100 determines whether the active mode of the first subscriber identity IMSI1 is to be terminated. This determination may be done in different ways for different embodiments. In one embodiment, the determination in step 530 involves manual interaction with the user 2, as is seen in steps 532 and 534 of FIG. 5. In step 532, information is presented in the user interface 162 of the terminal 100 to alert the user 2 of the fact that the second subscriber identity IMSI2 has been paged by the second network 201. The user is informed that if this paging is to be replied to, the active mode of the first subscriber identity IMSI1 must be terminated. Also see 450 in FIG. 8. If the user 2 accepts such termination in step 534, the execution proceeds to a following step 540; if not, the execution may proceed to a following step 538.

In another embodiment, the determination in step 530 is performed automatically without manual interaction with the user 2, as is seen in step 536 of FIG. 6. In step 536, the controller 150 decides whether the mobile terminal 100 is currently involved in an ongoing communication transaction for the first subscriber identity IMSI1 on the first mobile communication network 1. It is to be noticed that such ongoing communication transactions between the first subscriber identity IMSI1 of the terminal 100 and the first network 101 may appear in different transaction types (or classes, categories, natures, etc.). Thus, an ongoing communication transaction may for instance be of a prioritized type, or of a less prioritized/non-prioritized type. A prioritized ongoing communication transaction may for instance be an activity which the user 2 is likely taking active part in or does not want to be interrupted for some other reason. Examples of prioritized transactions include "foreground" activities such as an ongoing voice call, video call, or receipt of a live audio or video stream. Automatically terminating such a "foreground" activity would probably be very irritating to the user 2. A less prioritized or non-prioritized transaction may for instance be a "background" activity which is likely occurring in the mobile terminal 100 without any active participation by the user 2. Examples of such "background" activities are email retrieval, synchronization of email, calendar and contacts, checking for news flash information, and updating of current weather and financial data. It may be noted that there may be "background" activities which are still prioritized, such as software and security updates.

In some embodiments, the automatic determination and conclusion step 536 results in a decision not to terminate the active mode of the first subscriber identity IMSI1, as soon as there is an ongoing communication transaction, irrespective of its type. In other embodiments, the automatic determination and conclusion step 536 discriminates between at least first and second transaction types, so that it may be decided to terminate the active mode of the first subscriber identity IMSI1 when the ongoing communication transaction is of a less prioritized or non-prioritized second type (e.g. a background activity), but not when it is of a prioritized first type (e.g. a foreground activity).

It is also envisioned that alternative embodiments may use a hybrid between the manual determination (steps 532-534) and automatic determination (step 536). In one such possible alternative embodiment, the user 2 is presented with an option to decide whether or not an ongoing communication transaction is to be terminated when such transaction is of the second (less prioritized or non-prioritized) type, whereas no option will be given if the transaction is of the first (prioritized) type. In another such possible alternative embodiment, the user 2 is presented with an option to decide whether or not an ongoing communication transaction is to be terminated when such transaction is of the first (prioritized) type, whereas no option will be given if the transaction is of the second (non-prioritized) type, in which case the transaction will automatically be terminated. It is also possible to discriminate between more than two different transaction types.

If the result of the step 534 or 536 is that the active mode of the first subscriber identity IMSI1 shall be terminated, then this is effectuated in a following step 540. Thus, terminal 100 terminates the active mode by sending a message 460 to the controller 113 of the first mobile communication network, requesting release of the radio connection to the first network 1. In response, terminal 100 receives an acknowledgement 462. Then, in a following step 550, the second subscriber identity IMSI2 is caused to enter an active mode on the second mobile communication network 201. In a subsequent step 560, the terminal 100 will respond to the auxiliary paging message 442 for the second subscriber identity IMSI2 by sending a paging acknowledgement 446 (FIG. 8) to the controller 213 on the second network 201.

The paging acknowledgement 446 is a radio-based ordinary paging response to the radio-based ordinary paging request 444 sent from the controller 213 to the second subscriber identity IMSI2 in FIG. 8. "Ordinary paging request" and "ordinary paging response" refer—for the embodiments disclosed herein—to the procedures for paging as defined and described in the relevant 3GPP standards. See for instance 3GPP TS 25.211, 25.212, 25.214 and 25.331.

The sending of the paging acknowledgement 446 will allow the controller 213 and the second network 201 to comply with the requirements for paging in the 3GPP standards. In some embodiments, in addition to this, an auxiliary IP-based paging response may be sent from the mobile terminal 100 to the controller 213 of the second network 201 over the IP network(s) 122 and/or 222.

In some embodiments, if it has been concluded in step 536 (or 534) that the active mode of the first subscriber identity IMSI1 shall not be terminated, then an IP-based rejecting response to the auxiliary paging message 442 may be sent in a step 538 from the mobile terminal's first subscriber identity IMSI1 over the IP networks 122, 222 to the controller 213 of the second network 201. This rejecting response will indicate to the controller 213 that the mobile terminal 100 is unavailable for performing mobile communication transactions with the mobile terminal's second subscriber identity IMSI2. Upon receipt of this rejecting message in a step 350 in FIG. 5, the controller 213 of the second network 201 may then in a following step 360 refrain from sending any further auxiliary paging messages at least for a certain time period.

An alternative approach, when it has been concluded that the active mode of the first subscriber identity IMSI1 is not to be terminated, involves temporarily suspending the active mode of the first subscriber identity. The second subscriber identity IMSI2 will then temporarily enter active mode, send a radio-based rejecting paging response to the controller 213 over the second network 201, and quickly exit the active mode. The active mode of the first subscriber identity IMSI1 will then be resumed again. These activities may occur so fast that the user 2 will not notice the temporary suspension of IMSI1:s active mode. This alternative approach has a benefit in that it allows a fully standard-compliant rejecting paging response to the controller 213, letting it know that it is no use in paging the second subscriber identity IMSI2 for the time being.

Figure 9:
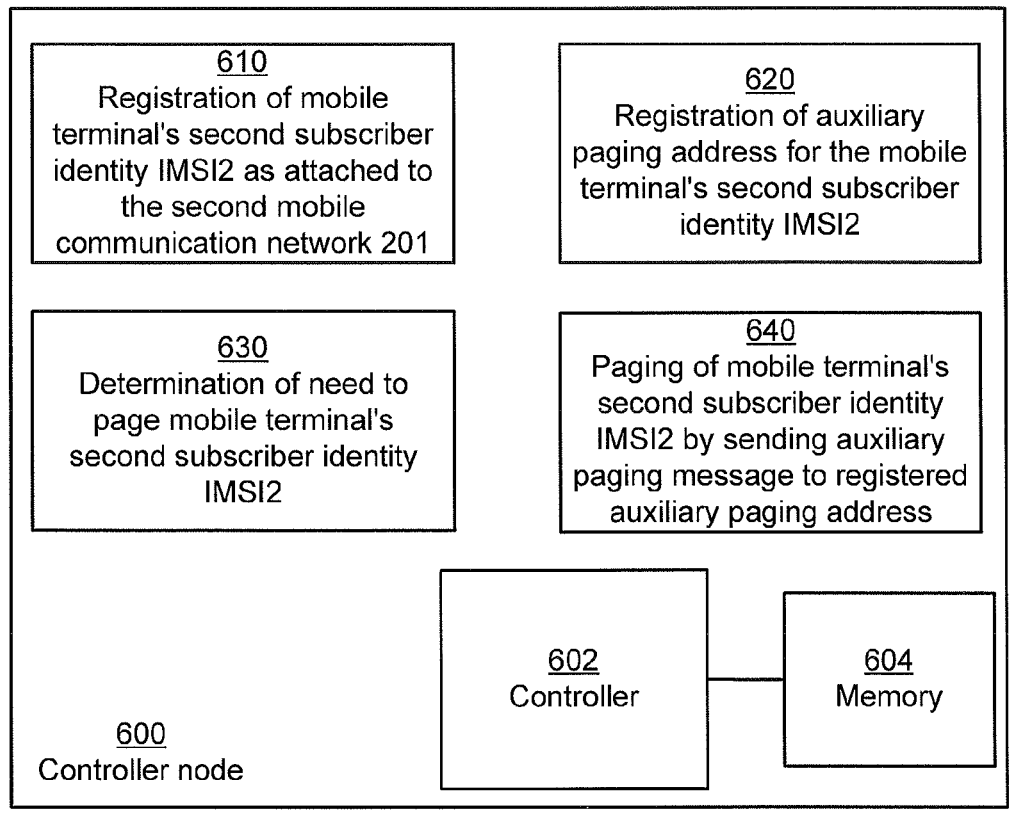
FIG. 9 is a schematic block diagram of the network node in the second mobile communication network, capable of performing the method of FIG. 5.

FIG. 9 illustrates, on a schematic level, the network node 213 in the second mobile communication network 201 and the components required to perform the previously described auxiliary paging method of FIG. 5. Thus, the network node (referred to as 600 in FIG. 9) comprises a controller 602 and a memory 604. The memory may comprise computer program code which is executable by the controller 602, such that a plurality of modules 610-640 are provided. At least one first module 610 is adapted to register the mobile terminal's second subscriber identity as attached to the second mobile communication network. At least one second module 620 is adapted to register an auxiliary paging address for the mobile terminal's second subscriber identity. At least one third module 630 is adapted to determine a need to page the mobile terminal's second subscriber identity. At least one fourth module 640 is adapted to page the mobile terminal's second subscriber identity, wherein said paging involves sending an auxiliary paging message to the registered auxiliary paging address, and wherein the auxiliary paging message is adapted for delivery to the mobile terminal's first subscriber identity. As an alternative to being software-based, some or all of the modules 610-640 may be implemented partly or fully in hardware.

The invention has been described above in detail with reference to embodiments thereof. However, as is readily understood by those skilled in the art, other embodiments are equally possible within the scope of the present invention, as defined by the appended claims.

For instance, the order of the first and second subscriber identities, SIM cards, mobile communication networks and controller nodes does not have to be identical to the order disclosed but may on the contrary be reversed.

Also, even though the first and second subscriber identities IMSI1 and IMSI2 reside in local memory areas 104, 204 of SIM cards 102, 202 which are physically inserted into corresponding SIM card readers in the DSDS mobile terminal 100 in the disclosed embodiments, this must not be the case in alternative embodiments. In such alternative embodiments, one or both of the first and second subscriber identities IMSI1 and IMSI2 may be provided to the mobile terminal in the form of a SIM software application executed in the terminal 100, and/or as a virtual SIM which is "stolen" or "borrowed" from another device and is rendered accessible to the terminal 100 by way of the wireless interface 154 or serial interface 156.

It is further to be noticed that the invention also embraces embodiments with three or even more different subscriber identities/SIM cards in a single mobile terminal.

The first and second mobile communication networks can be provided by different network operators and therefore be different networks on a logical and/or physical level. However, it is also conceivable that the first and second mobile communication networks are one and the same network on a logical and/or physical level.

Specifically as regards the term "mobile terminal" as used throughout this document, it is to be noticed that this does not necessarily mean that such a mobile terminal 100 must be truly mobile in a physical sense. Rather, the term "mobile terminal" shall be construed as a terminal capable of attaching to first and second mobile communication networks. Therefore, the mobile terminal itself may be operated, or even designed to be operated, in a physically stationary manner. Examples of such "stationary mobile terminals" include remotely readable metering equipment (e.g. electricity, water or gas meters) which communicate with a central by means of mobile communication such as GSM, UMTS or LTE. Other examples are router equipment serving to connect a local network (e.g. a home network) to a global network (e.g. the Internet) by means of such mobile communication, or remote alarm equipment for alerting a triggered alarm to a security central.

Specifically as regards the term "subscriber identity" as used throughout this document, it is to be noticed that this is not limited to IMSI:s (even though this is the case in the disclosed embodiments). Other types of subscriber identities are also possible within the scope of the invention, including but not limited to identities which primarily represent a device identity and are only indirectly linked to a subscriber. The IMEI (International Mobile Equipment Identity) is one such example.

The invention claimed is:

1. A method for paging of a terminal having a first subscriber identity attachable to a first mobile communication network and a second subscriber identity attachable to a second mobile communication network, the method performed in a controller node of the second mobile communication network, the method comprising:
   registering, in the controller node, the second subscriber identity as attached to the second mobile communication network;
   registering, in the controller node, an auxiliary paging address for the second subscriber identity;
   determining, in the controller node, a need to page the second subscriber identity; and
   paging the second subscriber identity by sending an auxiliary paging message from the controller node to the registered auxiliary paging address, wherein the auxiliary paging message is adapted for delivery to the first subscriber identity.

2. The method of claim 1, wherein registering an auxiliary paging address for the second subscriber identity comprises:
   receiving, from the second subscriber identity, a request for auxiliary paging, wherein the request includes the auxiliary paging address; and
   acknowledging, to the second subscriber identity, that the auxiliary paging address has been registered.

3. The method of claim 1:
   wherein paging the second subscriber identity comprises sending the auxiliary paging message to the registered auxiliary paging address by way of IP-based data communication; and
   wherein the registered auxiliary paging address includes an IP address of the first subscriber identity.

4. The method of claim 1, further comprising:
   receiving a rejecting response to the auxiliary paging message from the first subscriber identity, the rejecting response indicating that the terminal is unavailable for performing mobile communication transactions with the second subscriber identity; and
   suspending sending further auxiliary paging messages at least for a certain time period.

5. The method of claim 1:
   wherein the second mobile communication network comprises a core network and a radio access network; and
   wherein paging the second subscriber identity comprises sending a radio-based paging request to the second subscriber identity over the radio access network prior to, in parallel with, or after the sending of the auxiliary paging message.

6. A method for paging of a terminal having a first subscriber identity attachable to a first mobile communication network and a second subscriber identity attachable to a second mobile communication network, the method performed by the terminal, the method comprising:
   in an active mode of the first subscriber identity on the first mobile communication network, receiving an auxiliary paging message concerning the second subscriber identity and originating from a controller node of the second mobile communication network;

determining if the active mode of the first subscriber identity is to be terminated;
if the active mode of the first subscriber identity is to be terminated, causing entry into an active mode of the second subscriber identity on the second mobile communication network; and
responding to the auxiliary paging message for the second subscriber identity on the second mobile communication network.

7. The method of claim 6, further comprising:
attaching the second subscriber identity to the second mobile communication network;
sending a request for auxiliary paging to a controller node of the second mobile communication network, wherein the request for auxiliary paging includes an auxiliary paging address for the second subscriber identity;
receiving an acknowledgement from the controller node of the second mobile communication network; and
generating, to the first subscriber identity, an auxiliary paging monitor control instruction concerning the auxiliary paging address for the second subscriber identity.

8. The method of claim 7, further comprising:
attaching the first subscriber identity to the first mobile communication network;
receiving the auxiliary paging monitor control instruction; and
initiating monitoring of the auxiliary paging address to allow reception of the auxiliary paging message by the first subscriber identity.

9. The method of claim 8:
wherein the auxiliary paging address includes an IP address associated with the second subscriber identity; and
wherein the auxiliary paging message is received by way of IP-based data communication.

10. The method of claim 6, wherein determining if the active mode of the first subscriber identity is to be terminated comprises:
presenting, via a user interface of the terminal, an option to terminate the active mode of the first subscriber identity and enter the active mode for the second subscriber identity; and
retrieving, via a user interface of the terminal, an indication of whether the active mode of the first subscriber identity is to be terminated.

11. The method of claim 6, wherein determining if the active mode of the first subscriber identity is to be terminated comprises:
deciding whether the terminal is involved in an ongoing communication transaction for the first subscriber identity with the first mobile communication network; and
if the terminal is involved in an ongoing communication transaction for the first subscriber identity with the first mobile communication network, concluding that the active mode of the first subscriber identity is not to be terminated.

12. The method of claim 6, wherein determining if the active mode of the first subscriber identity is to be terminated comprises:
deciding whether the terminal is involved in an ongoing communication transaction for the first subscriber identity with the first mobile communication network; and
if the terminal is involved in an ongoing communication transaction for the first subscriber identity with the first mobile communication network:
discriminating between at least a first transaction type and a second transaction type for the ongoing communication transaction;
if the ongoing communication transaction is of the first transaction type, concluding that the active mode of the first subscriber identity is not to be terminated; and
if the ongoing communication transaction is of the second transaction type, concluding that the active mode of the first subscriber identity is to be terminated.

13. The method of claim 6, further comprising if the active mode of the first subscriber identity is not to be terminated, sending, by way of an IP-based data communication, a rejecting response to the auxiliary paging message from the first subscriber identity, the rejecting response indicating that the terminal is unavailable for performing mobile communication transactions with the second subscriber identity.

14. The method of claim 6, further comprising, if the active mode of the first subscriber identity is not to be terminated:
temporarily suspending the active mode of the first subscriber identity;
temporarily entering into active mode for the second subscriber identity, sending a radio-based rejecting paging response from the second subscriber identity to the controller node over the second mobile communication network, and exiting the active mode of the second subscriber identity; and
resuming the active mode of the first subscriber identity.

15. A controller node for paging of a terminal having a first subscriber identity attachable to a first mobile communication network and a second subscriber identity attachable to a second mobile communication network, the controller node configured to be comprised in the second mobile communication network, the controller node comprising:
a first set of one or more module circuits configured to register the second subscriber identity as attached to the second mobile communication network;
a second set of one or more module circuits configured to register an auxiliary paging address for the second subscriber identity;
a third set of one or more module circuits configured to determine a need to page the second subscriber identity; and
a fourth set of one or more module circuits configured to page the second subscriber identity, wherein the paging involves sending an auxiliary paging message to the registered auxiliary paging address, and wherein the auxiliary paging message is adapted for delivery to the first subscriber identity.

16. The controller node of claim 15, wherein the second set of one or more module circuits is configured to register the auxiliary paging address for the second subscriber identity by:
receiving from the second subscriber identity a request for auxiliary paging, wherein the request includes the auxiliary paging address; and
acknowledging to the second subscriber identity that the auxiliary paging address has been registered.

17. The controller node of claim 15:
wherein the fourth set of one or more module circuits is configured to page the second subscriber identity by sending the auxiliary paging message to the registered auxiliary paging address by way of IP-based data communication;
wherein the registered auxiliary paging address includes an IP address of the first subscriber identity.

18. The controller node of claim 15, wherein the controller node is further configured to:
- receive a rejecting response to the auxiliary paging message from the first subscriber identity, the rejecting response indicating that the terminal is unavailable for performing mobile communication transactions with the second subscriber identity; and
- suspend sending further auxiliary paging messages at least for a certain time period.

19. The controller node of claim 15:
- wherein the second mobile communication network comprises a core network and a radio access network; and
- wherein the fourth set of one or more module circuits is configured to page the second subscriber identity by sending a radio-based paging request to the second subscriber identity over the radio access network prior to, in parallel with, or after the sending of the auxiliary paging message.

20. A terminal platform configured to have a first subscriber identity attachable to a first mobile communication network, and a second subscriber identity attachable to a second mobile communication network, the terminal platform comprising:
- a terminal controller configured to:
  - in an active mode of the first subscriber identity on the first mobile communication network, receive an auxiliary paging message concerning the second subscriber identity and originating from a controller node of the second mobile communication network;
  - determine if the active mode of the first subscriber identity is to be terminated;
  - if the active mode of the first subscriber identity is to be terminated:
    - cause entry into an active mode for the second subscriber identity on the second mobile communication network; and
    - cause response to the auxiliary paging message for the second subscriber identity on the second mobile communication network.

21. The terminal platform of claim 20, wherein the terminal controller is further configured to:
- attach the second subscriber identity to the second mobile communication network;
- send a request for auxiliary paging to a controller node of the second mobile communication network, wherein the request for auxiliary paging includes an auxiliary paging address for the second subscriber identity;
- receive an acknowledgement from the controller node of the second mobile communication network; and
- generate, to the first subscriber identity, an auxiliary paging monitor control instruction concerning the auxiliary paging address for the second subscriber identity.

22. The terminal platform of claim 21, wherein the terminal controller is further configured to:
- attach the first subscriber identity to the first mobile communication network;
- receive the auxiliary paging monitor control instruction; and
- initiate monitoring of the auxiliary paging address to allow reception of the auxiliary paging message by the first subscriber identity.

23. The terminal platform of claim 22:
- wherein the auxiliary paging address includes an IP address associated with the second subscriber identity; and
- wherein the auxiliary paging message is received by way of IP-based data communication.

24. The terminal platform of claim 20, wherein the terminal controller is configured to determine if the active mode of the first subscriber identity is to be terminated by:
- presenting, via a user interface of the terminal, an option to terminate the active mode of the first subscriber identity and enter the active mode for the second subscriber identity; and
- retrieving, via the user interface of the terminal, an indication of whether the active mode of the first subscriber identity is to be terminated.

25. The terminal platform of claim 20, wherein the terminal controller is configured to determine if the active mode of the first subscriber identity is to be terminated by:
- deciding whether the terminal is involved in an ongoing communication transaction for the first subscriber identity with the first mobile communication network; and
- if the terminal is involved in an ongoing communication transaction for the first subscriber identity with the first mobile communication network, concluding that the active mode of the first subscriber identity is not to be terminated.

26. The terminal platform of claim 20, wherein the terminal controller is configured to determine if the active mode of the first subscriber identity is to be terminated by:
- deciding whether the terminal is involved in an ongoing communication transaction for the first subscriber identity with the first mobile communication network; and
- if the terminal is involved in an ongoing communication transaction for the first subscriber identity with the first mobile communication network:
  - discriminating between at least a first transaction type and a second transaction type for the ongoing communication transaction;
  - if the ongoing communication transaction is of the first transaction type, concluding that the active mode of the first subscriber identity is not to be terminated; and
  - if the ongoing communication transaction is of the second transaction type, concluding that the active mode of the first subscriber identity is to be terminated.

27. The terminal platform of claim 20, wherein the terminal controller is further configured to, if the active mode of the first subscriber identity is not to be terminated, send, by way of an IP-based data communication, a rejecting response to the auxiliary paging message from the first subscriber identity, the rejecting response indicating that the terminal is unavailable for performing mobile communication transactions with the second subscriber identity.

* * * * *